W. B. & E. W. WESCOTT.
APPARATUS FOR HEATING COATED FABRIC.
APPLICATION FILED NOV. 7, 1912.
1,102,178.
Patented June 30, 1914.
2 SHEETS—SHEET 1.
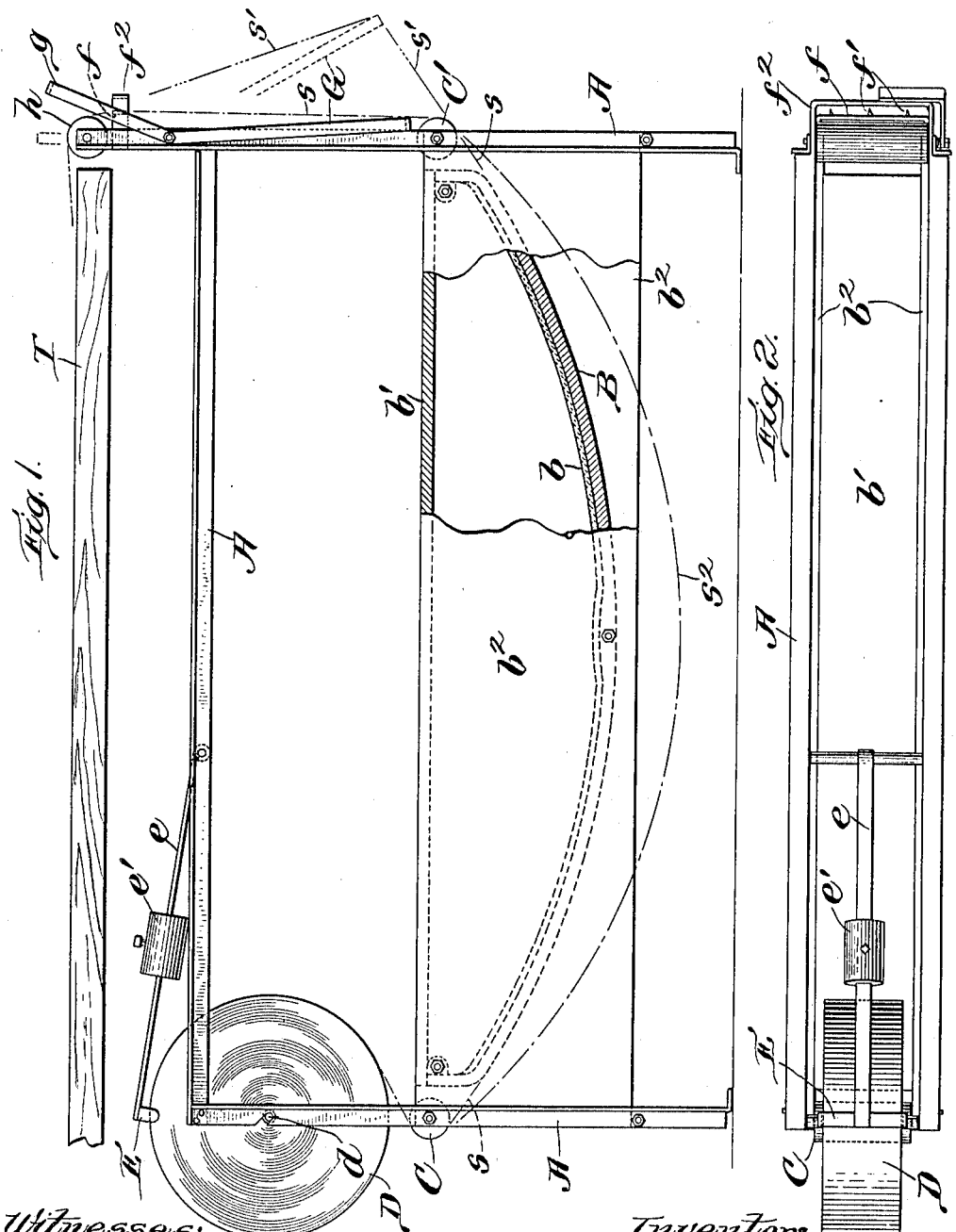

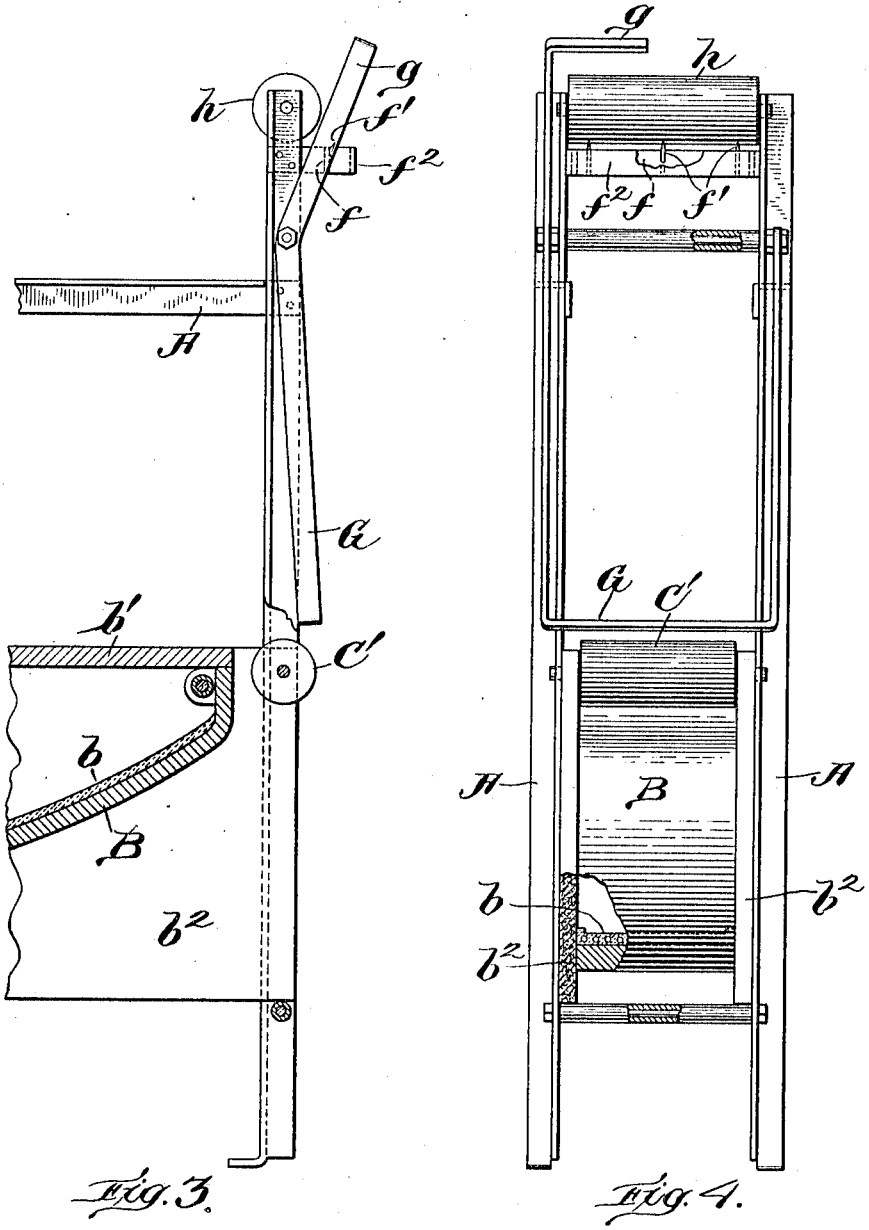

UNITED STATES PATENT OFFICE.

WILLIAM BURTON WESCOTT AND ERNEST WATERS WESCOTT, OF BOSTON, MASSACHUSETTS, ASSIGNORS, BY MESNE ASSIGNMENTS, TO WALPOLE SHOE SUPPLY COMPANY, OF BOSTON, MASSACHUSETTS, A CORPORATION OF MAINE.

APPARATUS FOR HEATING COATED FABRIC.

1,102,178.  Specification of Letters Patent.  Patented June 30, 1914.

Application filed November 7, 1912. Serial No. 730,020.

*To all whom it may concern:*

Be it known that we, WILLIAM BURTON WESCOTT and ERNEST WATERS WESCOTT, citizens of the United States, and residents of Boston, in the county of Suffolk and State of Massachusetts, have invented new and useful Improvements in Apparatus for Heating Coated Fabric, of which the following is a specification.

This invention relates to an apparatus for heating fabric strips, and particularly strips of cement coated fabric known in the trade as "gem duck" used in the manufacture of "gem insoles", so-called. In the manufacture of "gem insoles", according to the prevailing practice, a strip of the cement-coated fabric is drawn, cement side up, from a roll across the heated surface of a plate or table, for the purpose of softening the cement coating and rendering the same tacky. Thence the fabric is drawn on to a work table, where the leather blanks of the insole are laid on the sticky surface of the fabric, and adhere thereto. Subsequently the strip is cut apart between the leather blanks, and the fabric is then properly trimmed. From time to time the work is interrupted, as when the operator is disposing of a completed "lot" of soles and getting a fresh lot, and for various other causes, and consequently, at such times the cement-coated strip is not being moved along over the heated plate. If it is left on the plate that portion of the strip in contact with the plate becomes over cooked, or burned, and is rendered unfit for use and has to be cut off and thrown away. Sometimes the strip is lifted off the heated plate and looped or hung over a bracket to keep it out of contact with the plate. This prevents it from being injured by prolonged or excessive heating, but it requires undue time and attention on the part of the operator, and unless great care is used some part of the sticky surface of the strip thus folded or looped up will come into contact with some other part of the strip and adhere thereto, damaging the strip quite as much as if it were over heated.

The principal purpose of the present invention is to overcome these objections and to provide a heating apparatus in which the fabric strip may be held in contact with and drawn across the heater plate, or instantly and easily moved out of contact with the plate by means so simple and easy to operate that it will be easier for the operator to move the strip out of contact with the plate than to leave it on the plate and then cut off and dispose of the spoiled length.

In the accompanying drawings which illustrate one embodiment of the invention,—Figure 1 is a side elevation (partly broken away to show a section) of an apparatus for heating fabric strips containing our invention; Fig. 2 is a plan view of said apparatus; Fig. 3 is an enlarged side elevation, partly in section, of the right hand end of the apparatus shown in Fig. 1; and Fig. 4 is an enlarged end view of said apparatus viewed from the right of Fig. 1.

A represents a supporting frame on which the other parts are mounted, and B represents the heater plate having a downwardly facing curved or convex surface along which the fabric passes, as presently to be described. The heater plate B is heated by an electrical heater coil embedded in a layer of enamel $b$, or other suitable insulation, on the inner or concave side of the plate B. A cover $b'$ extends across the top of the plate B and the sides of the plate and cover are embraced between the side walls $b^2$ which are preferably made of some heat insulating material, such as asbestos, or a compound containing asbestos.

At the ends of the plate B are guide rollers C and C′ journaled between the side walls $b^2$. At the receiving end of the apparatus is a roll of fabric D, wound on a spindle or shaft $d$, the ends of which are removably lodged and rotate in sockets or notches provided therefor in the upright members of frame A, as shown in Fig. 1. A brake engages the roll D consisting of a friction bar E, carried on the end of an arm $e$ which is journaled on the frame H. A weight $e'$ is adjustable on arm $e$ to vary the pressure of the brake and consequently the tension on the fabric strip along the plate. At the delivery end of the apparatus is a fabric holding device consisting as herein shown of a bar $f$ secured to the uprights of frame A, and provided with teeth or spurs $f'$ extending upwardly at an angle, to engage the fabric strip passing upward over said spurs. A guard rail $f^2$ to shield said spurs is provided just outside of bar $f$.

While in heating position the fabric strip passes from roll D, downward under roller C, then underneath and in contact with the curved surface of plate B, thence under roller C′, upward across the bar F and against spurs f′, and thence over roller h at the top of the frame A, and on to the work table T. The fabric strip is drawn by hand along the course just described and the spurs f′ will catch and hold the strip in any position as it is pulled upward. Normally the strip will be held under tension against the inverted curved surface of the plate B, proper tension being maintained by the fabric-holding spurs at one end, and the roll D at the other end, which is held from unwinding too freely by the brake E.

In order that the operator may readily drop the fabric strip out of contact with the plate B, we provide a tension loosener, by which the roll D may be unwound a short distance, without otherwise disturbing the apparatus, so as to let the fabric hang down a little below the surface of the heater plate. This tension loosener comprises a U-shaped bail G pivoted to the uprights of the frame A between the guide roller C′ and the strip holding devices f f′. A handle g for operating said tension loosener extends upwardly alongside the frame. The cross piece of the bail G is just above roller C′ and underneath the fabric strip. The normal position of the strip in contact with the heater plate B is shown at s in broken lines. By swinging the tension loosener outward away from the frame A to dotted line position in Fig. 1, a short length of fabric is unrolled from roll D by the pulling of the fabric outward as indicated by the broken line s′. When handle g is released the tension loosener G will fall back again to its original position, and the slackened strip will drop out of contact with the heater plate B, and hang in the position shown at s².

We claim:

1. An apparatus for heating fabric strips, comprising a heater plate having a downwardly facing convex surface, and fabric holding devices at each end of said plate adapted normally to support the fabric strip underneath and in contact with said convex surface, said fabric holding devices at one end of said plate being movable to slacken the fabric strip and lower it out of contact with said plate.

2. An apparatus for heating fabric strips, comprising a heater plate having a downwardly facing convex surface, and fabric holding devices at each end of said plate adapted normally to support the fabric strip underneath and in contact with said convex surface, said fabric holding devices at one end of said plate being adapted positively to hold the fabric strip against downward or slackening movement at that end, and the fabric holding devices at the opposite end of said plate being movable to slacken the fabric strip at that end and lower it out of contact with said plate.

3. An apparatus for heating fabric strips, comprising a heater plate having a downwardly facing convex surface, a roller mounted at one end of said plate adapted to hold a roll of strip fabric, and strip retaining means at the other end of said heater plate adapted to permit the upward or forward movement of said strip but to prevent the downward or slackening movement of said strip.

4. An apparatus for heating fabric strips, comprising a heater plate having a downwardly facing convex surface, a holder for a roll of strip fabric at one end of said heater plate, strip retaining means at the other end of said heater plate, and a movable tension loosener adapted to unwind a sufficient length from the roll of strip fabric to cause the strip to hang below and out of contact with said convex surface.

5. An apparatus for heating fabric strips, comprising a heater plate having a downwardly facing convex surface, a guide roller at each end of said heater plate for guiding the fabric strip to and from the convex surface, and a tension loosener adapted to unwind a sufficient length from the roll of strip fabric to cause the strip to hang below and out of contact with said convex surface.

6. An apparatus for heating fabric strips, comprising a heater plate having a downwardly facing convex surface, means for supporting a roll of strip fabric, a guide roller at each end of said heater plate for guiding the fabric strip to and from the convex surface, and a tension loosener comprising a pivoted frame at the end of the heater plate opposite to the supporting means for the fabric roll, adapted to unwind a sufficient length from the roll to cause the strip to hang below and out of contact with said convex surface.

7. In combination, a frame, a heater plate mounted on said frame having a downwardly facing convex surface, means for supporting a roll of strip fabric on said frame above one end of said heater plate, strip retaining devices on said frame above the other end of said heater plate, a table above said heater plate and a movable tension loosener between said strip retaining devices and the end of said heater plate adapted to unwind a sufficient length from the roll of strip fabric to cause the strip to hang below and out of contact with said convex surface.

8. An apparatus for heating fabric strips, comprising a heater plate having a downwardly facing convex surface, a roller mounted at one end of said plate adapted to hold a roll of strip fabric, and strip retaining means at the other end of said heater plate adapted to permit the upward or forward movement of said strip but to prevent the downward or slackening movement of said strip, and a brake adapted to retard the unwinding of said strip from said roller, thereby normally holding the strip under tension against said heater plate and also permitting said strip to be unwound to lower it out of contact with said plate.

9. An apparatus for heating fabric strips, comprising a heater plate having a downwardly facing convex surface, fabric holding devices at each end of said plate adapted normally to support the fabric strip underneath and in contact with said convex surface, said fabric holding devices at one end of said plate being movable to slacken the fabric strip and lower it out of contact with said plate, and a guide roller at each end of said heater plate for guiding the fabric strip to and from the convex surface.

Signed by us at Boston, Massachusetts, this 26th day of October, 1912.

WILLIAM BURTON WESCOTT.
ERNEST WATERS WESCOTT.

Witnesses:
ROBERT CUSHMAN,
CHARLES D. WOODBERRY.

---

Copies of this patent may be obtained for five cents each, by addressing the "Commissioner of Patents, Washington, D. C."